United States Patent [19]

Ogle et al.

[11] 3,766,420

[45] Oct. 16, 1973

[54] PANEL-TYPE DISPLAY DEVICE

[75] Inventors: James A. Ogle, Neshanic Station; George E. Holz, North Plainfield, both of N.J.

[73] Assignee: Burroughs Corporation, Detroit, Mich.

[22] Filed: Mar. 17, 1972

[21] Appl. No.: 235,706

Related U.S. Application Data

[60] Division of Ser. No. 850,984, Aug. 18, 1969, abandoned, and a continuation-in-part of Ser. No. 828,793, May 28, 1969, abandoned.

[52] U.S. Cl. ........ 313/109.5, 313/182, 315/169 TV

[51] Int. Cl. ........ H01j 1/78

[58] Field of Search ........ 313/109.5, 182; 315/169 TV, 169 R

[56] References Cited

UNITED STATES PATENTS

| | | | |
|---|---|---|---|
| 2,978,610 | 4/1961 | Schiavone | 315/169 R |
| 3,612,938 | 10/1971 | De Boer | 315/169 R X |
| 2,958,807 | 11/1960 | Steinberg | 315/169 R |
| 3,499,167 | 3/1970 | Baker et al. | 315/169 R |

*Primary Examiner*—Roy Lake
*Assistant Examiner*—Lawrence J. Dahl
*Attorney*—Kenneth L. Miller et al.

[57] ABSTRACT

A display device comprising a panel structure including a plurality of gas-filled cells and including, within the body of the panel, gas communication channels extending between selected cells to provide a selective flow of excited gaseous particles from certain cells to others to prime the receiving cells and thereby control the transfer of glow between the cells.

8 Claims, 13 Drawing Figures

PANEL-TYPE DISPLAY DEVICE

This application is a division of application Ser. No. 850,984, filed Aug. 18, 1969 and a continuation-in-part of application Ser. No. 828,793, filed May 28, 1969, both now abandoned.

BACKGROUND OF THE INVENTION

The present invention concerns panel display devices of the type which include large numbers of gas-filled cells arrayed in rows and columns and energizable selectively to display a character or message or any other form of display. To date, such devices have appeared as laboratory models under investigation from time to time over a period of many years, but no one has yet succeeded in making a commercial device. In general, such devices include at least two electrodes, an anode and a cathode, for each cell, and a separate driver circuit for each cathode and each anode, or for each row of cathodes and each column of anodes, for applying thereto the voltages needed to turn on each cell and generate visible glow therein.

Although panels can be operated in this way, it can be seen that, in a panel which includes thousands of cells, the provision of a separate driver for each cathode and each anode, or even for each row and column of cells, is prohibitively expensive and complex. The prior art provides no satisfactory solution to this problem.

SUMMARY OF THE INVENTION

The present invention generally provides a display panel including a plurality of light-producing, gas-filled cells and including means within the panel itself for facilitating the energization of cells and thus simplifying the required external drive circuitry. The panel includes such structural features, and it is connected in such a drive system, that it may be used to provide a raster scan, that is, the panel cells may be fired in series, beginning with a first cell and continuing through each row of cells to the last.

DESCRIPTION OF THE PREFERRED EMBODIMENTS

Figure 1:
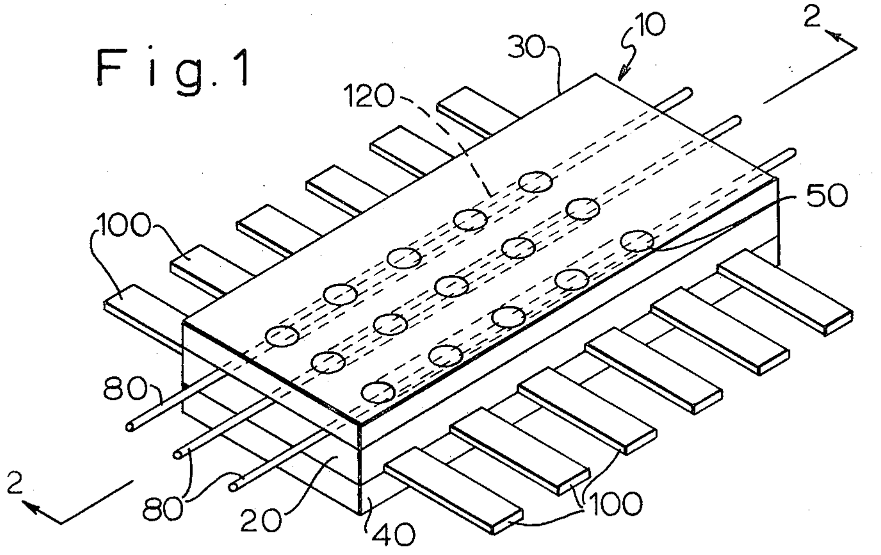
FIG. 1 is a perspective view of a display panel embodying the invention.

A gas-filled display device 10 embodying the invention is in the form of a flat panel and comprises a sandwich of flat plates including a central plate 20 of glass or ceramic, a top viewing plate 30 of glass, and a bottom plate 40 of glass or ceramic. The central plate 20 is provided with rows and columns of holes or cells 50, and it has a top surface 60 and a bottom surface 70. The cells 50 are operated as information display cells and are filled with a gas of the type which can sustain cathode glow.

The gas in the cells 50 may be neon, argon, etc., or mixures of these gases, and is preferably a Penning mixture in which the gases of the mixture have related energy levels such that the metastable atoms of one gas produce ions of the other gas. Vapors of metals such as mercury may also be added to the gas to minimize sputtering. While a Penning mixture of neon and mercury might be used, the mercury vapor pressure, and hence the relative pressures of such gases, are temperature-sensitive. It is desirable to avoid the temperature-sensitivity problem, at least insofar as the functioning of the Penning mixture is concerned. Therefore, it is preferable to include a second gas which forms a Penning mixture with neon, and then add mercury to the mixture. Neon-xenon has been found to be particularly effective as a Penning mixture in one embodiment of the invention, for reasons which will be discussed. The gas pressure is preferably between 100 to 250 Torr, and, more particularly, about 175 Torr.

The device 10 is provided with a top set of parallel electrodes 80 and a bottom set of parallel electrodes 100, with the sets being perpendicular to each other and arrayed so that each cell has two electrodes, one at the top of the cell and one at the bottom of the cell. A cell is fired and caused to glow by he application of suitable potentials to the electrodes 80 and 100 which cross each other at the particular cell. In the following description, the upper electrodes are considered to be anodes, and the lower electrodes are considered to be cathodes, and, for purposes of this description, the device 10 is oriented so that the anodes are row electrodes and each is aligned with a row of cells, and the cathodes are column electrodes and each is aligned with a column of cells.

The electrodes may be flat metal strips, or they may be wires, and they may be seated in slots or depressions, either in the central plate or in the top or bottom plates, if desired. In addition, the upper conductors 80, if they are flat strips, are provided with holes 90 (FIG. 2) where they overlay cells 50 to permit a glowing or fired cell to be seen by a viewer looking through top plate 30 when the device 10 is in operation. Viewability of cells can also be achieved if electrodes 80 are wires which are narrower than the cells 50 and do not cover the cells completely. If desired, each lower cathode electrode may be provided with a raised portion 110 which projects into each cell with which it is aligned. This permits adjustment of the anode-to-cathode spacing in each cell, if necessary; however, this is not required. Also, it provides a convenient way of aligning the cathode electrodes 100 with the cells of the respective columns.

The central plate 20 and the top and bottom glass plates 30 and 40 are usually rectangular, with the top and bottom plates being somewhat larger than the center plate (shown only in FIG. 2) to permit a sealing material 42, such as a glass frit, to be placed between them to seal all of the plates together in a gas-tight assembly. The row and column conductors extend beyond the edges of the plates so that they can be readily connected to electrical circuitry.

It is known that a gas cell which is exhibiting glow generates excited particles including gas ions, electrons, uncharged metastable atoms, and the like. According to the invention, means are provided for permitting selective gas communication and the flow of such excited particles from a glowing or fired cell to adjacent cells in the panel, particularly for permitting communication in the direction in which glow is to be propagated from cell to cell. This free flow and availability of excited particles facilitates the selective transfer of glow from a fired cell to an adjacent cell. This permits a simplification in the drive circuitry which is described in greater detail below.

Figure 2:
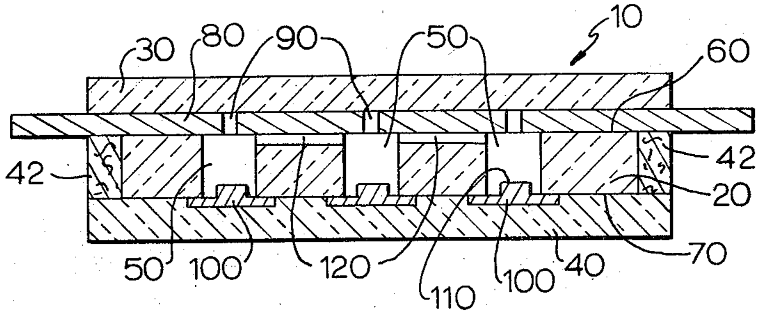
FIG. 2 is a sectional view, along the lines 2-2 in FIG. 1, with the dimensions and number of display cells being changed to simplify the drawing.
Figure 3:
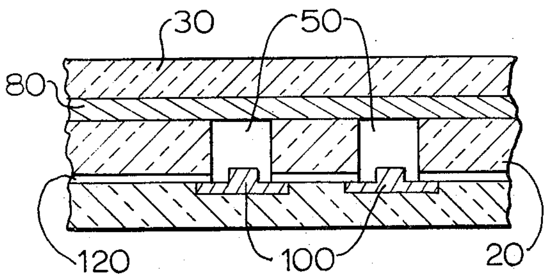
FIG. 3 is a sectional view showing a modification of a portion of the panel of FIG. 2.
Figure 4:
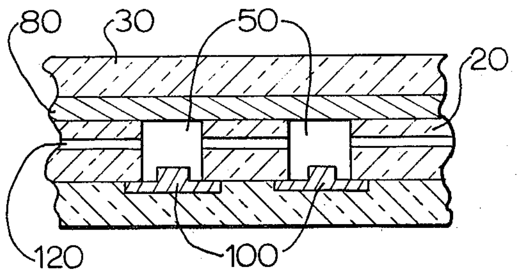
FIG. 4 is a sectional view showing another modification of a portion of the panel of FIG. 2.

One arrangement for providing the desired gas communication comprises slots 120 formed in the central plate 20. The slots may be provided at various locations, for example, in the top surface 60 as shown in FIG. 2, in the bottom surface 70 as shown in FIG. 3, or at an intermediate location as shown in FIG. 4.

Depending on the mode of operation of a panel, the slots 120 may extend between adjacent anodes and/or between adjacent cathodes, as will be clear from the description below. However, at the suggested operating pressure range of 100 to 250 Torr, the slots preferably extend between the cathodes for reasons which will be explained.

Display panel 10 embodying the invention includes any desired number of rows and columns of display cells 50 for displaying a message and, in addition, a group of cells 50S known as starter cells or particle-supply cells for providing excited particles for expediting the turn-on of the information display cells 50. In one embodiment of the invention, illustrated schematically in FIG. 5, display panel 10 includes rows and columns of display cells 50A, 50B, 50C, etc. and a column of particle-supply cells 50S to the left of the column of cells 50A. Each cell 50S is connected to the adjacent cell 50A by a slot 120. In addition, the particle supply cells are connected together by column slots 126. The cells 50S have their own column cathode 100S connected to a suitable power source or driver 161, and they share the anode electrodes 80 with the display cells 50. The particle-supply cells 50S need not be, and are preferably not, seen by a viewer and may be obscured by the upper anode electrodes associated therewith.

The panel 10 also includes a "keep-alive" mechanism or a source of first electrons which, as is well known in the art, are required to initiate glow discharge in a gas cell. In panel 10, the keep-alive mechanism comprises a column of gas cells 123 positioned in operative relation with the supply cells 50S and having their own anode 124 and cathode 125. Such cells 123 are constantly energized and glowing but are concealed from view. The keep-alive mechanism may comprise just a single cell 123 adjacent to one of the supply cells and having its own anode 124 and cathode 125 connected to voltage supply Vk, by means of which it is continuously energized and held ON and glowing.

In a typical panel 10, the central plate 20 is about 1 mm. in thickness, the top and bottom plates 30 and 40 are about 1 to 3 mm. in thickness, and the cells 50 are about 0.04 inch in diameter at a density of about 16 cells per linear inch. The electrodes 80 and 100 are about 0.05 inch wide and about 5 mils deep. The communication slots 120 are 0.04 inch wide and 0.015 inch deep, while slots 126 are 10 × 5 mils.

In general terms, the display panel 10 is operated in a scanning mode in which each column of display cells is turned ON, in turn, from left to right, and the glow in each column is modulated in accordance with input signal information. The soanning operation is repeated continuously at such a rate that a stationary but changeable message is displayed by the panel.

Figure 5:
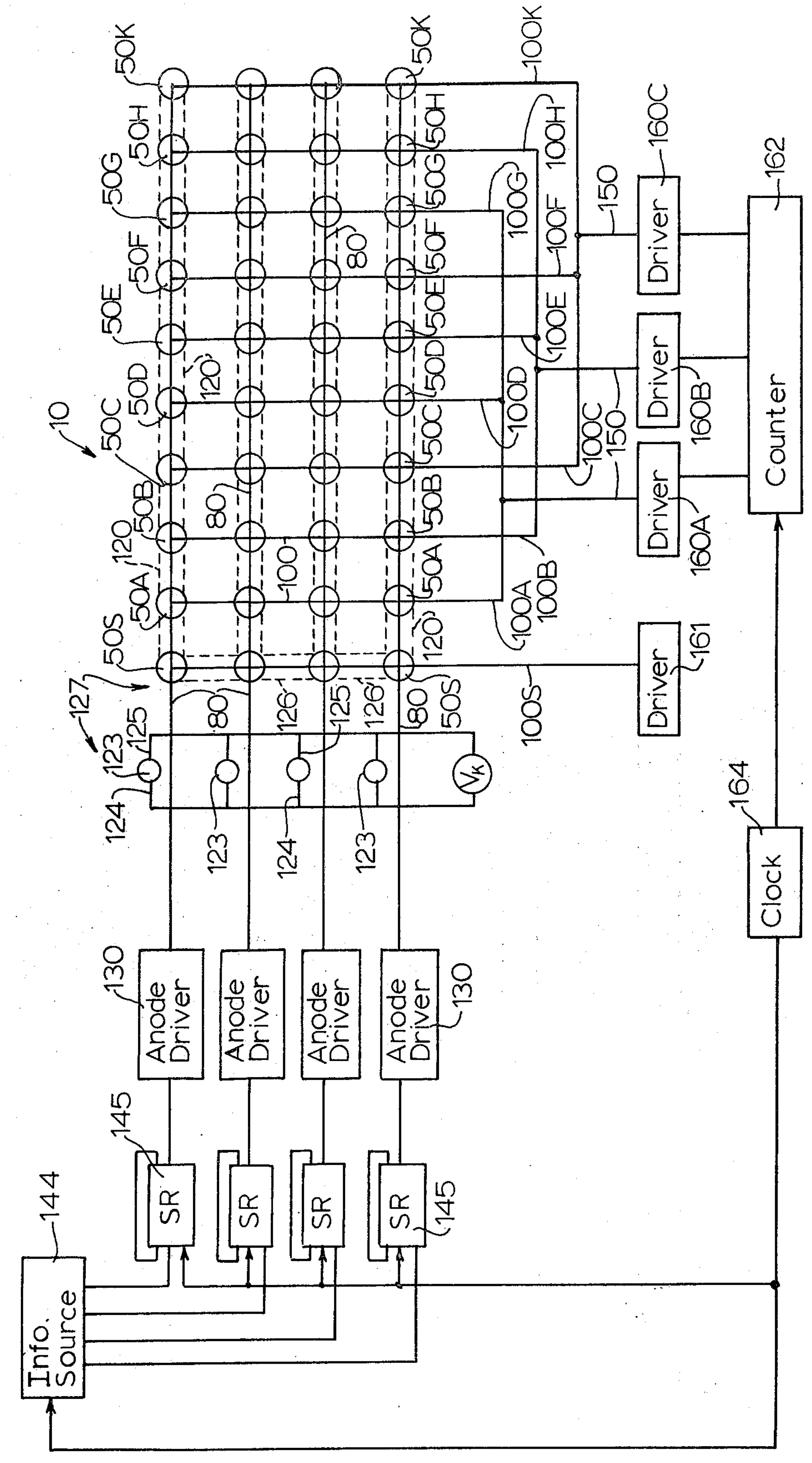
FIG. 5 is a schematic representation of the panel of FIG. 1 and an electronic system in which it may be operated.

Considering FIG. 5, in one mode of operation of panel 10, operating potential is first applied to the particle-supply cells 50S, and these cells turn on with the aid of the keep-alive cells 123. These cells 503 are also referred to as reset cells since they serve to reset the column scan of the display panel to the first column. The glowing gas in cells 50S produces excited particles which diffuse in alldirections and through slots 120 to the adjacent OFF cells 50A. Next, operating potentials are removed from cells 50S and are applied to cells 50A in the first column of display cells, and these cells 50A turn ON relatively easily beacuse of the excited particles which have diffused to them through slots 120, and because of the excited particles still present in the extinguished cells 50S which are attracted to them by the applied potentials. After cells 50A turn ON, the flow in them is modulated in accordance with input signal information applied to the row anodes 80. Wiile cells 50A are ON, excited particles diffuse from them through slots 120 to cells 50B. Next, operating potentials are removed from cells 50A, and they are applied to cells 50B, and cells 50B turn ON, just as cells 50A had turned on previously. The glow in cells 50B is then modulated in accordance with input information on anodes 80. Each column of cells, in turn, is turned ON in this same way, with new signal information being applied to anodes 80 as each new column is turned ON, and, when the last column is reached, the cycle is repeated, at such a rate that a message is displayed in the panel.

Considering FIG. 5 in greater detail, it incudes a system 127 and a panel 10 shown in schematic form. The system 127 includes a source of information signals 144, of any suitable type, which is coupled to the inputs of recirculating shift registers 145, and the output terminals of the respective shift registers are coupled to and operate anode drivers 130, which are in the form of current sources connected to the row anodes 80. A clock circuit 164 operating in the range of 5 to 20 kh is connected to and operates in synchronism with the information source 144, the shift registers 145, and a counter 162.

The column cathode electrodes 100 of panel 10 are connected in groups, with every third cathode being interconnected. Thus, the cathodes of columns 50A, 50D and 50G are interconnected, the cathodes of columns 50B, 50E and 50H are interconnected, and the cathodes of columns 50C, 50F and 50I are interconnected. Each of these groups of cathodes is connected by a lead 150 to a driver or switching circuit 160A, 160B, or 160C, for applying operating potentials to the cathodes. Negative-going pulses are applied by the drivers 160, and these cooperate with corresponding relatively positive anode voltages, generated by the anode drivers 130, to initiate and control cell glow. Counter 162 operates the cathode drivers 160A, 160B and 160C sequentially, and, as noted, it is coupled to a clock circuit 164 to provide the required synchronism between the energization of the respective cathodes and the application of signal information to the anodes.

In the operation of the panl 10, first, all of the anode current drivers 130 are turned on to apply a turn-on level of positive potential to all of the row anode electrodes 80, and, at the same time, a potential, negative with respect to the anodes, is applied to the cathode 100S by driver 161, whereby current flows through the particle-supply cells 50S, and they turn ON and glow. The turn-on of cells 50S is facilitated by the keep-alive cells 123. As cells 50S glow, they generate excited particles which diffuse into slots 120 and into the first column of display cells 50A.

Next, cathode driver 161 of cells 50S is turned off, and the first cathode driver 160A is energized to apply a negative potential to cathode 100A associated with cells 50A. This also has the effect of applying a negative potential to cathodes 100D and 100G associated with cells 50D and 50G, respectively. All of the current sources 130 are still set at the level which provided the turn-on current for cells 50S, so that a rapid glow transfer to cells 50A is achieved. Typical anode current curves and cathode voltage curves have been shown in FIGS. 6 and 7.

During the transfer or switching period, when driver 161 is turned off and the first cathode driver 160A is turned on, current flow through cells 50S is discontinued and the potential of the anodes 80 tends to rise. Thus, when driver 160A is turned on, the resultant potential across cells 50A combines with the excited particles present in cells 50A by diffusion, and the large numbers of particles attracted by the applied potential, to cause cells 50A to turn ON and current flows through cells 50A. The potential on the anodes 80 then drops to a relatively low level.

The more remote cells 50D and 50G which are also coupled to the first cathode driver 160A, do not have the proper combination of applied voltage and accessibility to the supply of excited paticles to cause them to turn ON and glow. The reason for this is that, either because the lifetime of the excited particles of the cells is short or because they are removed at the cell walls or electrodes, these particles are available for only a relatively short time, and they are not likely to travel, at least in any quantity, farther than one column of cells. Thus, they selectively prime only the adjacent cells, and the panel can consequently be scanned with only three column drivers 160, rather than a separateriver for each column.

Figure 6:
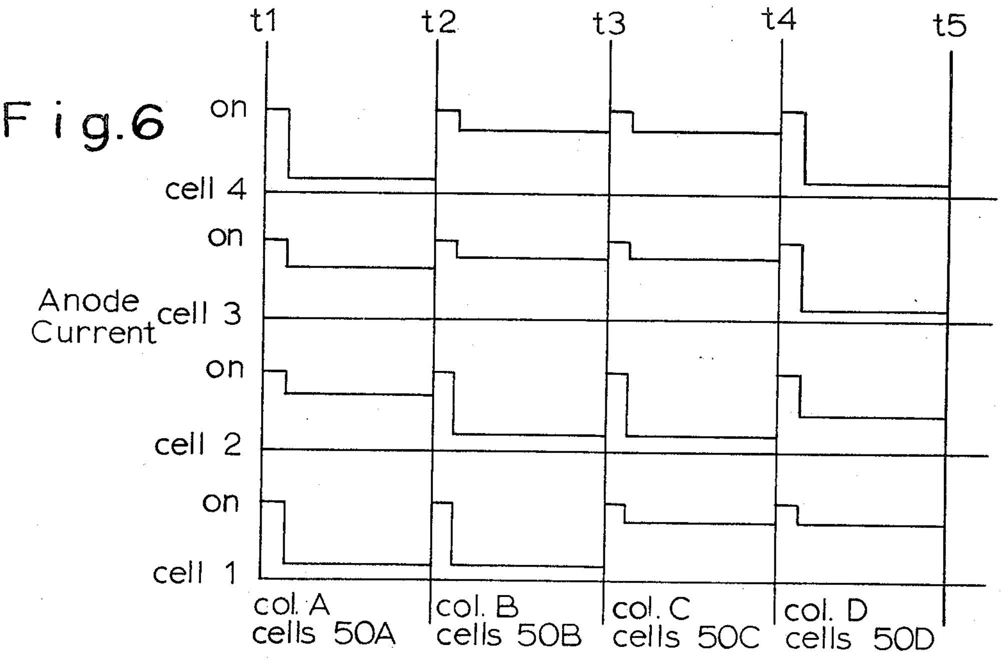
FIG. 6 shows qualitatively the anode current which flows in some of the cells of the panel of FIG. 5 during a portion of a cycle of operation.
Figure 7:
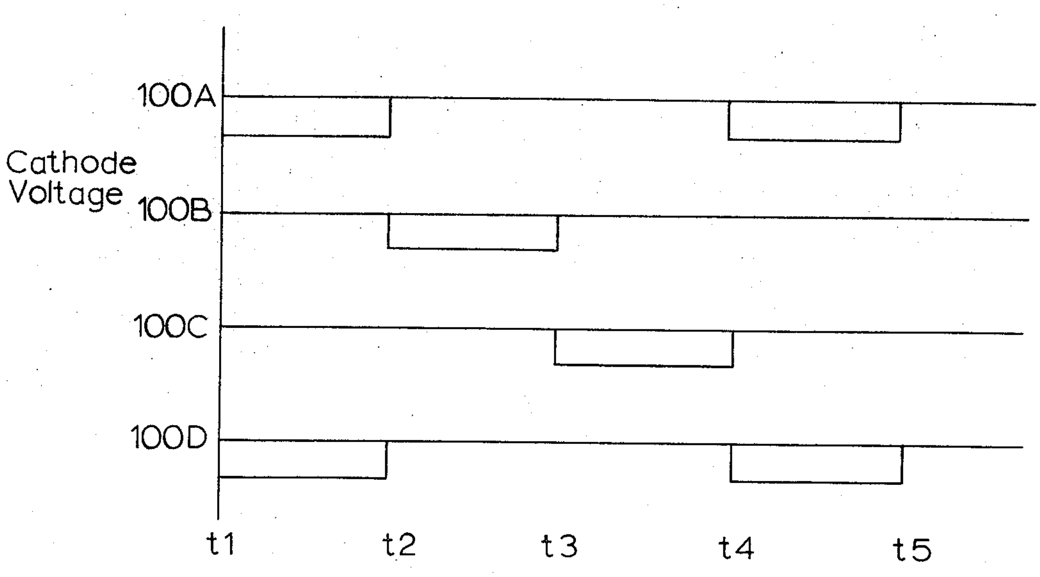
FIG. 7 shows cathode voltages applied to some of the cells in the panel of FIG. 5 during a portion of a cycle of operation.

The waveforms of FIG. 6 illustrate the turn-on anode current flowing through all cells 50A at time $t1$, which represents the time at which operating potential is first applied to cells 50A by driver 160A, as shown by FIG. 7.

Shortly after cells 50A are turned on by driver 160A, the anode urrent flow through the drivers 130 is modulated in accordance with the received signal information. This modulation is a control of the anode current level at various levels between a very low level which is insufficient to render the cell visible and a very high level which is sufficient to produce a very bright glow discharge. Also, it includes intermediate levels to produce a gray scale display. Once set, the current level remains fixed for one column scan period, although this is not essential, but the level is changed as the scan proceeds from column to column, as required by the signal information from source 144, to producea display corresponding to such information.

The modulation can, of course, be made up of just two current levels, if gray scale is not desired. In this event, a current coresponding to a desired brightness is selected for one level and a very low current is selected for the second level, and the result is a binary-type or OFF-ON visual display.

As shown in FIG. 6, once the signal information is applied by anode drivers 130, shortly after time $t1$, the current flow in the 50A cells is maintained at various levels. As represented, the top and bottom cells 50A, called cells 1 and 4 in FIG. 6, are at a very low current level. These cells are actually OFF from a visual or light output standpoint. However, they are not OFF from a glow discharge standpoint. Rather, they are held at a very low glow discharge level, so that the glow discharge in these cells is not visible from the front of the panel, and yet the cells nevertheless maintain a source of excited particles sufficient to prime the corresponding cells 50B of the next column. Cells 2 and 3 on the other hand, exhibit relatively high current levels which differ slightly from one another to produce the desired brightness levels.

At time $t2$, the first cathode driver 160A is turned off, and the second cathode driver 160B is turned on, to apply cathode potential to cells 50B, the potential also being applied to cells 50E and 50H. Simultaneously, the intensity of the current flow from the anode drivers 130 (FIG. 6) is increased to a high level, so that a rapid transfer of the glow to the second colummn of cells 50B is achieved, facilitated by the transfer of clouds of excited particles through slots 120.

Immediately thereafter, current flow from anode drivers 150 is modulated in accordance with input signal information, and in accordance with brightness levels to be displayed by the various cells 50B. This is illustrated in FIG. 6 whic shows in column B, cells 1 and 2 OFF from a visual standpoint, though glowing at a low level, and cells 3 and 4 ON at about equal current and brightness levels. This transfer operation is repeated for each column of cells along the entire display device from left to right until the last column of cells is reached, and its selected cells are turned ON at the desired levels, at which time all cathode drivers 160 are turned off and the starter or reset cells 50S are energized again by driver 161, and the cycle is repeated.

If desired, the turn-on of the starter cells 50S at the beginning of each cycle may be controlled automatically by deriving a signal from the last column of display cells when the latter cells areturned ON, or OFF.

The foregoing scanning cycle is repeated continuously at a sufficient rate, such as 5 to 20 kh, that the cells which are energized for only short periods during each scan appear to remain on, without any visible flicker, and display a stationary but changeable message. As the signal inputs to the anode current drivers change, the modulated anode currents also change and so does the visible message.

The modulation of the anode currents was described in the foregoing operation as occurring slightly after the transfer of the san to each new column of cells, i.e., slightly after times $t1$, $t2$, $t3$, etc., and this is illustrated by the abrupt changes in the waveforms of FIG. 6 at these times. This mode of operation is, however, not essential. The modulation could be applied at the precise time of the transfers. However, if this were done, the transfer operation would be attended by the complication that the glow discharges in the new cells are attempting to start at all different current levels, depending upon the applied signal information.

To avoid this, especially since glow transfer is the most critical step in the operation of the panel, the anode current is permitted to rise to some predetermined relatively high level when the glow is being transferred, and modulated shortly thereafter. The delay selected is equal to the longest glow transfer time exhibited by any cell of the panel, at the selected anode current, plus a slight margin. Thehigh current spikes were therefore very short, in the order of 5 microseconds, so that they did not affect the average brightness of the cells. For example, in the case of the visually OFF cells, the spikes produced no detectable glow. While this mode of operation is preferred, reliable glow transfer can be achieved by applying the transfer pulses from drivers 160 and the modulated anode currents simultaneously.

The column-by-column scanning of the panel 10, using the system of FIG. 5, has been described as utilizing three column drivers 160A, 160B and 160C, each connected to every third column cathode. It should be understood, however, that the number of phases of the column driving source need not be three. Indeed, an increase in the number of phases serves to increase the spacing between the commonly energized columns, and provides a greater safety margin against two columns driven by the same driver being sufficiently primed by migrating excited particles to turn ON. For example, if the column cells 50D in panel 10 are glowing, they prime cells 50C and 50E. When driver 160B then attempts to advance the scan, it pulses column cells 50E and achieves the advance. However, it also simultaneously pulses column cells 50B, and these cells are only one column away from the primed cells 50C. As already indicated, the priming particles in cells 50C do not reach cells 50B, so the three-phase system of FIG. 5 provides effective scanning, but an increased number of phases can be used where a greater margin is required or desired.

Viewing this from another aspect, an increase in the scanning phases permits a less controlled coupling of the excited gaseous particles between the cells, and perhaps ultimately a substantially open coupling structure. It also permits the use of a gas mixture with a slower de-ionization time, since it increases the time which elapses between successive pulsing of the same column. Alternatively, for a gas mixture of a fixed de-ionization time, an increased number of scanning phases permits an increase in the scanning rate, since the de-ionization time is the limiting constraint on the scanning rate.

An increase in the number of phases, however, increases the number of column drivers or switches required—the ultimate limit being one per column, which is one of the factors which rendered prior art panels prohibitively costly. Thus, while the invention contemplates the use of more than three scanning phases, but many less than one per column, a three-phase scanning drive is generally sufficient and is preferred.

It should perhaps also be mentioned that, whether the scanning drive includes three phases or more, the direction of scanning can advantageously be reversed simply by a phase reversal. This can be achieved by reversing the counter 162 of FIG. 5 or providing an appropriate switching network between the counter and the column drivers. This permits the direction of scan of the panel 10 to follow the scanning direction of a camera or other device which scans left and then right or vice-versa. The scan reversal also permits a selective brightness increase over any desired columns of the panel, by programming the scan to reverse and repeat only selected columns, and then return to its normal direction, while maintaining the applied signal information in synchronism with the scan pattern.

The number of scanning phases can also be reduced. Specifically, it can be reduced to a two-phase scan which alternately drives the alternate columns of the panel, such alternate columns being interconnected. This, however, cannot be done with the structures of FIGS. 1 to 4, since in these structures, each column primes both the preceding and succeeding columns, and, consequently, a two-phase drive would pulse both primed columns to produce ON cells in both directions. To utilize a two-phase scan, the cathodes or glow coupling passages would have to be shaped, or other arrangements such as a glow-focusing electrode employed, to cause this glow in each column, when present, to move closer to one of its adjacent columns, in preference to the adjacent column in the opposite direction, to provide the necessary selectivity and directivity to the scan. Once this preference is established, however, the directivity of the scan could not readily be changed, as it can in the case of a driver having three or more phases.

An additional point that should be mentioned is that, while it is indicated previously that the gas particle coupling slots 120 in panel 10 may extend between adjacent anodes or between adjacent cathodes, the later is much preferred. Indeed, at the high operating pressure suggested, which is between 100 and 250 Torr, glow transfer using anode switching is very difficult. When a gas discharge is established between a cathode and an anode of a cell at such a high pressure, if a glow discharge voltage is switched to an anode of another cell, the initial discharge may remain on the first cathode and simply stretch to the new anode. The reason for this is that at such pressures, the positive column portion of the glow discharge has very little voltage drop along its length, and consequently, the positive column merely extends to a new anode wigthout appreciably disturbing the field pattern of the glow discharge, and, consequently, without moving the glow discharge to a new cathode. While this action serves to extend the positive column to the new cell, it does not provide sufficient brightness in the new cell or extinguish the glow on the first cell. As a consequence of this, in all of the disclosed devices, cathode switching is recommended.

One further point to be noted as to the panel 10 is that the anode drivers 130 driving the panel should be in the nature of current sources, rather than voltage sources, i.e., they should exhibit constant current rather than constant voltage characteristics. Thus, when a primed column of cells is turned ON, the applied anode voltage should not remain constant, or even nearly constant. Since the applied anode voltage is above the minimum glow discharge potential for the cells, in order to produce a rapid turn-on of the primed cell, if this voltage remains constant after the primed cell turns on, it will shortly turn on the unprimed cells connected to the same anode and the same cathode driver 160 and cause spurious operation. To avoid this, once the primed cells turn ON, the applied anode voltage should drop appreciably to preclude the subsequent spurious turn ON of unprimed cells, as is characteristic of a current source.

Figures 8, 12, 13:
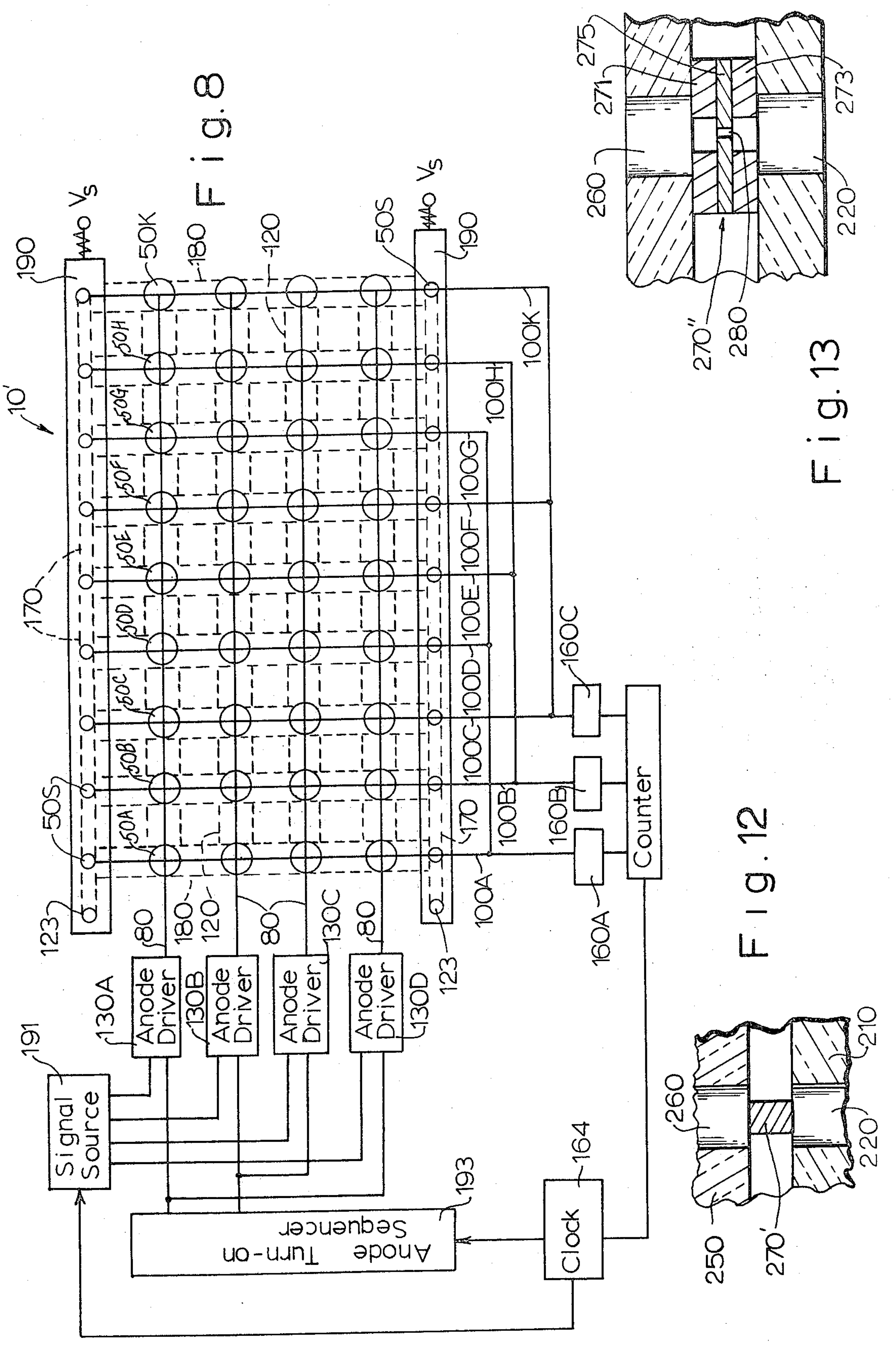
FIG. 8 is a schematic representation of a modification of the display panel shown in FIG. 5 and a system in which it may be operated.
FIG. 12 is a sectional view of a portion of the panel of FIG. 10 showing an electrode modification.
FIG. 13 is a sectional view of a portion of the panel of FIG. 10 showing an electrode modification.

A modified panel 10' and mode of operation are illustrated in FIG. 8, wherein scanning takes place along the columns of cells from left to right as above, but the popagation of excited particles and the turn-on of cells in each column takes place vertically from the top and bottom of a column to the center. The panel 10' includes rows and columns of display cells 50, and, although they are not required in this embodiment of the invention, the horixontal glow coupling slots 120 are provided between adjacent cells as above. The panel 10' includes two rows of particle-supply cells 50S, one postioned along the upper margin of the panel and the other positioned along the lower margin, with each cell in these two rows being aligned with a column of display cells 50. The supply cells are coupled together by horizontal particle propagation slots 170 extending along the rows from one cell to the next. In addition, the panel 10' includes vertical particle-propagation slots 180 extending along each column of cells from the lower supply cell 50S through the aligned column of display cells 50 to the upper supply cell 50S.

The panel 10' also includes a keep-alive mechanism or first electron source of the type described above, represented by numeral 123 and positioned in operative relation with the first starter cell in each of the upper and lower rows of supply cells.

In panel 10' shown in FIG. 8, the display cells are provided with anode and cathode electrodes 80 and 100, respectively, as above, and the supply cells 50S share the cathode electrodes 100 but have their own row anodes 190 which can be used to conceal the starter cells from view. Each of these anodes 190 is connected to suitable power supplies Vs so that the supply cells can be energized independently.

In operation of panel 10', the cathode driver 160A for the first column of cells is energized to apply the proper negative potential to first cathode 100A and to the column of cells 50A associated therewith. The first supply cells 50S, at the upper and lower ends of this column, turn ON, with th aid of the first electron source 123, since they now have both anode and cathode potentials applied. This occurs at time t1 and is represented by the horizontal line in FIG. 9 for the upper and lower cells 50S. Next, the anode drivers 130, fed by a suitable signal source 191, are energized in order, the outermost drivers 130A and 130D immediately adjacent to the supply cells 50S being energized at time *t*2, and the innermost drivers 130B and 130C at time *t*3. This operation is controlled by a suitable sequencing control circuit 193 driven by clock 164.

Figure 9:
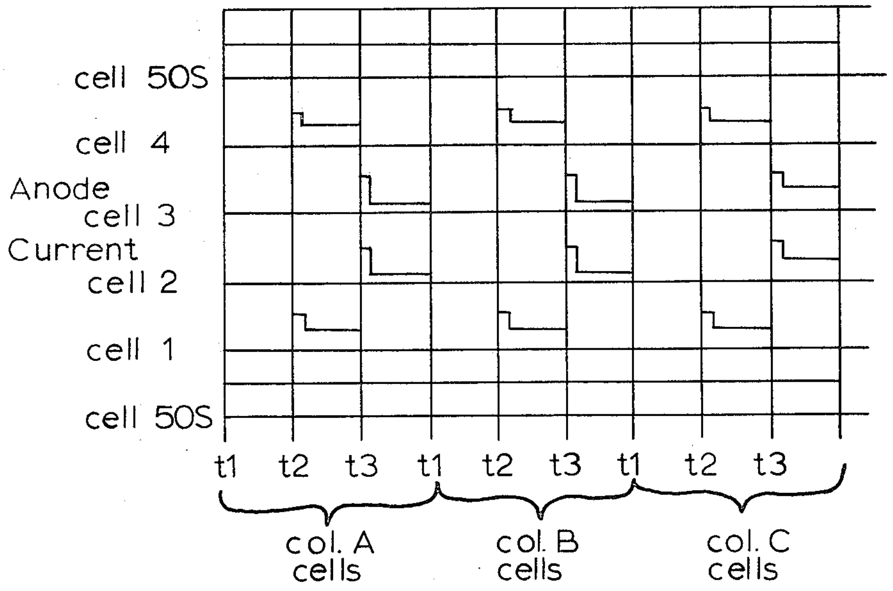
FIG. 9 shows anode current curves for some of the cells of the panel shown in FIG. 8 at different times in its cycle of operation.

Referring to FIG. 9, it will be seen that current flow through the upper and lower 50S cells remains constant throughout the entire scanning cycle. This is as a consequence of the steady anode voltage Vs applied to these cells, and the constant but stepping cathode voltage from drives 160. Actually, the ON condition remains present in the upper and lower 50S cells, but steps from column to column as the scan progresses.

Shortly after time *t*2, when the glow is transferred to the outermost cells 1 and 4 of column 50A, the current level in these cells is modulated by the anode drivers 130A and 130D to achieve a desired brightness level. At time *t*3, drivers 130A and 130D are turned OFF, extinguishing the glow in cells 1 and 4, and drivers 130B and 130C are turned ON. Cells 2 and 3 thus turn ON, the turn-on being facilitated by the excited particles from cells 1 and 4, and the current level in these cells is shortly thereafter modulated by the anode drivers 130B and 130C.

To scan the column 50B cells, called column B in FIG. 9, cathode driver 160B is energized to transfer the flow from the upper and lower 50S cells in column A to the upper and lower 50S cells in column B. The anode drivers are then sequentially energized, first drivers 130A and 130D and then drivers 130B and 130C, as discussed in connection with the column 50A cells. The column 50C cells are thereafter scnned in a similar way, first transferring the glow to the starter cells of the C column and then sequentially scanning that column. This is repeated for each column of cells in sequence, and the scan repeated at such a rate as to provide a steady but changeable message or picture on the panel.

An alternate way of operating the panel 10' of FIG. 8, which results in a different system, is to eliminate the anode turn-on sequencer 193 and apply the anode currents to the respective anodes 80 simultaneously. In this case, the upper and lower starter cells 50S aligned with column cells 50A are turned ON first by the cathode driver 160A, with the aid of the keep-alive cells 123. Thereafter, the anode drivers 130 apply a positive potential to cells 50A. This has the effect of causing the outermost cells 1 and 4 in columm 50A to turn ON at a fixed high current level, these cells having been primed by the adjacent starter cells 50S. The resulting glow in cells 1 and 4 serves to prime the innermost cells 2 and 3, whereupon the latter cells turn ON at a fixed high current level. Thus, all of the cells in column 50A are simultaneously ON for a very brief period, in the order of 5 microseconds.

The anode currents are then modulated, in accordance with the applied signal information, and the cells 50A assume brightness levels dictated by these current levels. The visually OFF level in this case, however, is represented by an extinguished cell, i.e., a cell having zero current flow. This is possible because the upper and lower starter cells 50S in line with cell column 50A are maintained ON, and consequently scanning of the next column 50B is achieved by moving the starter cell glow to the starter cells in line with display cells 50B. Column 50B is then scanned in the manner discussed in connection with column 50A, and the starter glow is then moved to the starter cells 50S in line with column 50C, and so forth until the entire panel is scanned. The scan is then repeated, as discussed.

It will be seen that the panel 10' of FIG. 8 involves both horizontal and vertical scanning. This can also be accomplished by a panel formed of only the display cells 50A to 50H of FIG. 8, since these cells all have vertical and horizontal glow transfer channels between them, a glow discharge established in the upper cell of column 50A, with the aid of a keep-alive or starter cell, can be scanned along the top row from left to right, then transferred to the secondrow and scanned from right to left, etc., until the entire panel has been scanned, the row anode sequencer 193 being connected to provide the row sequence pattern desired. In synchronism with this scan, modulated anode currents are applied by drivers 130, as discussed, preferably allowing a short delay in modulating until each transfer operation has been completed, to establish the desired display on the panel.

It will be seen, however, that the vertical scanning along the columns of display cells 50A to 50H in panel 10', unlike the horizontal scanning, utilizes glow coupling channels between anodes and thus involves anode switching. To avoid the problems already discussed in connection with anode switching at high pressures, onecan simply reverse the anode andcathode voltages, so that the anodes serve as cathodes and the cathodes serve as anodes. This can be done at each point in the scanning cycle where a change from horizontal to vertical scann1ng is desired, and the voltages returned to their normal sense when horizontal scanning is again desired. Indeed, in the display panels of thepresent invention, the anodes and cathodes are generally interchangeable in function, and consequently, a switching network can be incorporated to reverse the cathode-anode voltages whenever there is a change from horizontal to vertical switching or vice-versa — so that both vertical and horizontal scanning utilize cathode switching.

An alternative to cathode-anode reversal in the case of single cell scanning is to have a column of starter cells at one side of the panel, as in FIG. 5 for example, with the cathodes of the starter cells separate from the cathodes of the display cells. The panel can then be scanned cell-by-cell by establishing a glow discharge in the top starter cell 50S and then transferring it along the column from top to bottom, so that, as the glow moves sequentially along the starter column, it will prime the first display cell of each row. The rows can then be sequentially scanned in synchronism with the stepping of the glow along the starter column, by use of the column drivers 160A, 160B and 160C, and modulated currents from an anode driver 130 applied in synchronism with the resulting cell-by-cell scan. Since only one display cell is being utilized at a time in this mode of operation, a single anode common to all of the display cells can be employed.

In addition to this sequential scanning, any random point on the panel can be selectively caused to exhibit signal information, b6 stepping the starter column to an appropriate row level and then advancing the column drivers to reach the desired point. This is an addressing operation, and even the column-by-column scan may be viewed as an addressing operatio since it locates the sequential panel positions into which the input information is to be inserted.

In the random cell addressing operation, the addressing information is supplied by an external source to the starter cell stepper and the display column sequencer. Once the desired cell is reached in response to this information, a modulated anode current is applied. At the end of the time period allocated for energizing the selected cell, the glow condition of this cell can either be transferred to a new cell location, consistent with new addressing information, or extinguished so as to avoid interference with a new scan, and the scan repeated using the starter column and the column sequencer, as discussed. The choice of whether to scan with the glow of the previous cell or start a new scan can be made by an associated computer on the basis of their relative access time.

To reduce the access time for either of these modes of addressing, a starter column can be employed at the right-hand side of the panel, as well as at the left-hand side. In operation, both of these starter columns may be advanced together, and then the column sequencer operated from left to right starting at the left-most column of display cells or from right to left starting at the right-most column, depending upon whether the desired cell is closer to the left or right sides of the panel. Alternately, one can advance only one of the two starter columns, depending upon the location of the desired cell, and then operate the column sequencer from that column. Also, the starter columns can be divided in half, with one half serving the upper half of the panel and one serving the lower half. If these half columns are sequence simultaneously, and the column sequencer operated as discussed, the result will be the simultaneous addressing of corresponding cells in both the upper and lower halves of the panel. Utilizing two half-panel anodes, however, one can then apply the appropriate anode current level only to the desired cell.

Figure 11:
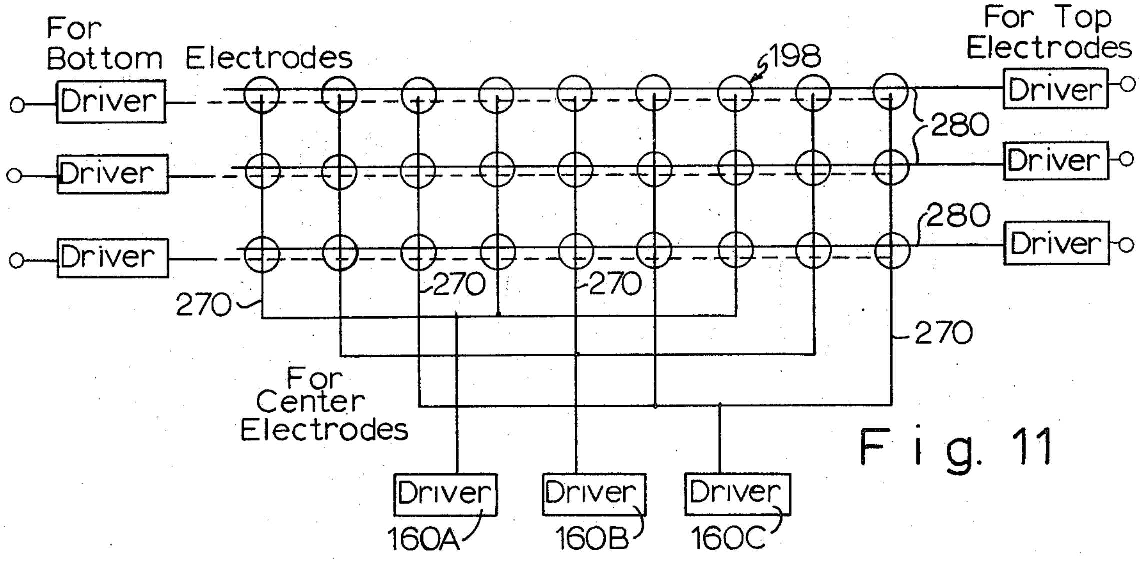
FIG. 11 is a schematic representation of the display panel of FIG. 10 and a system in which it may be operated.
Figure 10:
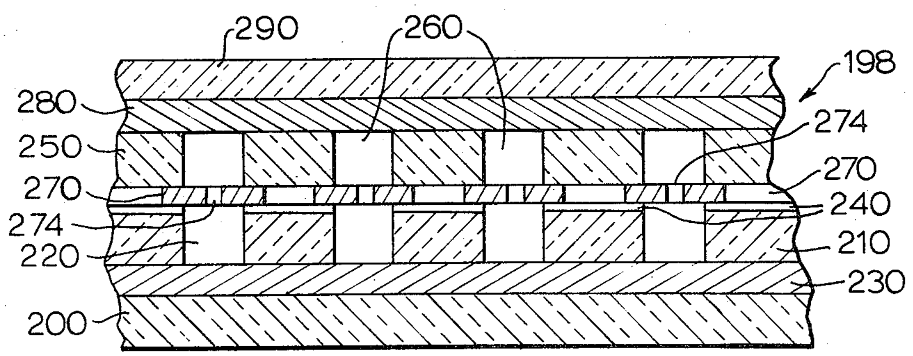
FIG. 10 is a sectional elevational view of another modification of the invention.

Another modification of the invention in which cell selection is achieved by the selective flow of exited particles from one cell to another is the display panel 198 shown schematically in FIGS. 10 and 11. The panel 198 is a two-layer panel and includes a first layer of cells 220 and a second layer of cells 260, each cell 220 being aligned with a cell 260. Thus, cells 220 and 260 communicate with each other from one layer to the other, with cells 220 comprising addressable particle-supply cells for cells 260 which serve as display cells. In operation, the layers 260 and 220 correspond to the front and back layers of the panel, since the display is viewed through plate 290.

The portion of panel 198 shown in FIG. 10 includes a bottom glass plate 200, a lower insulating (glass or ceramic) plate 210 which has the cells 220 formed in it in rows and columns, and row electrodes 230 disposed between plates 200 and 210, each aligned with a row of cells 220. Horizontal particle-propagation slots 240 are provided in the plates 210 interconnecting the cells 220 in each row. Alternatively, the slots 240 may be located at the middle or bottom of plate 210 as described above.

A second insulating (glass or ceramic) plate 250, similar to plate 210 and having an identical array of cells 260, is positioned above the plate 210 to have its cells vertically aligned with cells 220. Also, column electrodes 270 having apertures 274 are positioned between the two plates 210 and 250, with each column electrode aligned with a column of cells, and the apertures 274 in the column electrodes aligned with the cells in the top and bottom layers. The apertures 274 are preferably smaller in diameter than the cells 220 and 260.

If desired, electrodes 270 may be fabricated without apertures but made narrower than the cells (see electrodes 270' in FIG. 12) so that communication is provided between cells 220 and 260 around one or both edges thereof. Finally, upper row electrodes 280, in the form of wires or transparent strips, or flat strips having viewing apertures, are positioned between plate 250 and a top glass viewing plate 290 and aligned with each row of cells.

The various modes of operating the two-layer panel have, for convenience, been given names. The first to be described is called the "pull-through" mode. According to this mode, the back layer of panel 198 is generally scanned column-by-column, with no information signals applied to the scanning electrodes. Information signals are, however, applied to the front layer, in synchronism with the scan, to pull through the glow from the back to the front layer at selected points, and at controlled current levels, to produce a desired panel display.

More particularly, in the pull-through mode, the cells 220 of the back layer 210 are scanned column-by-column at a relatively low current and brightness level. The low level in this case need not be as low as the visually OFF glow dischrge level in the single layer panel of FIG. 5. The reason for this is that the glow in the back layer of the panel is viewable from the front of the panel only through the very small cathode apertures 274, and consequently, even if this glow is relatively bright, it can hardly be seen, and does not interfere with the display pattern on the front layer of the panel. Indeed, a viewer standing any reasonable distance from the viewing plate 290, as would be expected in the normal usage of the panel, would not see the back glowing cells even if they were operated at the same current level as the front.

The circuit shown in FIG. 5 can be used to perform the pull-through operating mode on panel 198, using the keep-alive and starter cells, and the three-phase column drivers 160 to scan the bottom layer, together with anode drivers which can be modulated to pull through the glow of selected cells. The upper and lower electrodes 230 and 280 are employed as anodes, while the central electrodes 270 are employed as cathodes. The lower anodes 230 are connected to current sources which supply a relatively low current level, as discussed. The central cathodes 270 are connected to the column drivers 160A, 160B and 160C, using the three-phase connection already discussed, and row anodes 280 are connected to anode drivers which can be modulated. This is shown schematically in FIG. 11, but it should be understood that, in this operating mode, the drivers 130 of FIG. 11 are set at a relatively low current level and maintained at this level, while the current drivers 300, connected to the upper electrodes 280, are modulated by information signals received from a source such as source 144 of FIG. 5.

As the back layer is scanned at a uniform current level using the column drivers 160, positive information signals are applied to the top anodes 280 by means of the current drivers 300, and wherever these signals are applied, glow from the cells 220 in the lower layer is transferred upwardly into the corresponding cells 260 of the upper layer. The different modulated levels of the current drivers 300 control the current level of the glow in cells 260 and hence the relative brightness of the various cells. In this way, a message can be displayed in the upper layer of cells 60 and viewed through the top plate 290, and as already noted, the glow in the lower layer of cells does not adversely affect the display in the upper layer.

In the above-described pull-through mode of operation, the voltages used may be about −100 volts for the central cathode electrodes, about +60 volts on the lower anodes, and about +60 volts on the upper anodes which are to conduct current.

The mechanism of the pull-through mode, which involves a transfer of glow from the scanning back layer to the front, is believed to involve a priming of the cells in the front layer by metastable atoms generated in the cells of the back panel as they are scanned. Once the metastable population in a cell of the front layer is sufficient, with the metastables creating ions through particle collision, the gas in the cells becomes conductive. As a result of this, and as a result of the positive potential applied to the top anodes 280, the glow along the lower surface of the cathode 270 will spread through the cathode aperture 274 to the top surface of the cathode. Hence, a glow discharge is effected in the upper cell.

Since the glow transfer mechanism thus appears to be based upon metastable particle priming, it is important to utilize a gas mixture which generates a substantial number of metastable atoms. Also, however, the gas mixture cannot be such that the metastable atoms will all be depleted through particle collisions before they can reach the front layer of the panel. While a Penning mixture of neon and argon is known to be rich in metastables, it has been found that such a mixture is not the best choice, since the metastable atoms interact in energy exchanges so quickly that a sufficient density of them does not readily reach the front panel. A Penning mixure of neon and xenon has, consequently, been found to be far superior. More specifically, the preferred mixture is a Penning mixture of 99.8 percent neon and 0.2 percent xenon, with a small quantity of mercury.

A neon-xenon Penning mixture alsoprovides a good separation of the breakdown and sustaining voltages of the gas cells, which is essential in the panels discussed, so that when a first cell glows, it will significantly reduce the applied voltage and prevent other cells connected to the same electrode voltages from subsequently turning on. On the other hand, the breakdown and sustaining voltages of the neon-xenon mixture are not separated so much as to require inordinate signal information levels and result in less efficient operation. More specifically, the neon-xenon mixture has been found to produce a minimum breakdown voltage of about 210 volts and a minimum sustaining voltgge of 150 volts.

The use of a Penning mixture of neon and krypton, with a small amount of mercury, is also contemplated. Indeed, any Penning mixture may be suitable so long as the energy exchange levels betwen the Penning constituents are not so well matched that themetastable atoms are not unduly dissipated by energy eschange collisions before they reach thefrontlayero the panel. Indeed, even a neon-argon Penning mixture may be sufficient if the percentage of argon is maintained sufficiently low.

Another consideration relevant to the pull-through operating mode is the size of the passages between the front and back layers. In the embodiment shown in FIG. 10, these passages are provided by apertures 274 in the cathode strips 270. Generally, the aperture size should be less than twice the distance between the negative glow region in the lower cell and the cathode surface producing the glow. The size, however, is inversely proportional to pressure, and at the suggested operating pressure of 175 Torr, the size should be between 0.5 and 5 mils, preferably about 3 mils. The size is aso dependent upon the thickness of the cathode strips. Smaller sizes are required with thinner cathodes and larger sizes with thicker cathodes. Indeed, with very thin cathodes, the optimum size may be substantially less than 0.5 mil, and perhaps as small as 0.1 mil. However, the size should not be greater than 5 mils, no matter how thick the cathodes are.

One arrangement of achieving a close control of the aperture size, by modifying the center electrodes 270, is illustrated in FIG. 13. The electrode 270'' shown in FIG. 13 is laminated and includes two metal layers 271 and 273 and an insulating layer 275 between them. The insulating layer 275 may, for example, be of mica, and it has a small opening 280, which may readily be precisely dimensioned. The discontinuous surface presented by this sheet, andthe small diameter aperture, provide a control of the transfer of glow from a lower cell 220 to an upper cell 260.

A second mode of operating the two-layer panel 198 of FIG. 10 is called the push-through mode. Basically, it involves scanning the back layer of the panel at a low current level, as in the pull-through mode, but applying the signal information synchronously to the back panel as it is scanned, rather than to the front layer. This increases the current level in selected cells of the back layer and causes the glow effectively to push through the cathode aperture to the front layer.

In the push-through mode, the bottom electrodes 230 are again anodes and the central electrodes 270 cathodes. However, the top electrodes 280 are not required, and may be omitted. Using this operating mode, the panel may also utilize the circuit shown in FIG. 5, using the keep-alive and starter cells, and the anode drivers 130 and three-phase cathode drivers 160. The anode drivers 130 are connected to the bottom anodes 230, as shown in FIG. 11, while the cathode drivers 160 are connected in a three-phase arrangement to the cathodes 270, using the keep-alive and starter cells to initiate the scanning, as discussed in connection with the system of FIG. 5.

As the lower layer of the panel is scanned column by column, using drives 160, the current flow in the cells 220 is maintained at least at some reduced level which will cause all of these cells to glow at a low level, but will not interfere with the display produced by the cells of the upper panel. As the scan proceeds column by column, modulated anode current is synchronously applied to the row anodes to increase the current in selected cells above such reduced level and cause a transfer of the glow to the corresponding upper cells. The modulated anode current is characterized by many different levels, up to a level which wil1 produce the maximum desired brighteness in the upper cells, and hence a gray scale display is achieved.

The mechanism of the push-through mode of operation is believed to be different from that of the pull-through mode. It is believed that in this mode the increased current level in selected cells of the lower layer causes ions from the positive column of the glow discharge to migrate through the apertures 274 between the upper and lower cells. When the population of these ions reaches a sufficient level, the ions serve as a gaseous conduction path in the top cells. Thus, the cathode glow on the lower surface of the cathodes 270 will spread through the apertures 274 to the top surface — and the ions in the upper cells provide a conduction path from this glow in the top cells to the anodes 230 in the bottom cells.

Since the push-through mode does not rely principally upon the migration of metastables to the cells of the top layer, except to the extent that some metastables may be active in producing the needed ions, the gaseous mixture need not have the same parameters as those employed in the pull-through mode. A Penning mixture of 99.8 percent neon and 0.2 percent xenon, with a small quantity of mercury, is nevertheless recommended, but a Penning mixture of neon and argon in the same percentages, with mercury, can also be used.

In the push-through mode, the requirements of the aperture size between the lower and upper cells are also different. The aperture size is generally larger than that employed in the pull-through mode. A size of approximately 3 to 10 mils will suffice, at the suggested gas pressure of about 175 torr.

Although, as noted, the push-through mode of operation does not require the top electrodes 280 (FIG. 10), these electrodes can be used to provide an auxiliary control in the form of a reverse bias or "push back." By placing a voltage on electrodes 280 that tends to inhibit the spread of glow from the bottom to the top layer, they thus provide a safety margin against an unintended feedthrough of this glow. This is accomplished, it is believed, by the electrodes 280 attracting or repelling any charge particles which tend to enter the cells of the upper layer, and thus serving as sweepout electrodes. Additionally reliability against faulty operation can thus be achieved by utilizing electrodes 280 as push back electrodes, in which event these electrodes are all maintained at a voltage level somewhat below the voltage level of the lower anodes 230. Thus, a potential of −100 volt is suitable for the cathodes, +60 volts for the lower anodes, and +40 volts for the push-back electrodes. Actually, since push-back electrodes are all maintained at the same voltage level, they are prefeably formed as a single large area electrode, either being transparent or suitably apertured to permit viewing.

A third mode of operating the two-layer panel is a combination of the pull-through and push-through modes. In this combination mode, the electrodes 230 and 280 of FIG. 10 are again operated as anodes, and the intermediate electrodes 270 as cathodes, just as in the pull-through mode. The two-layer panel 198 is operated using the FIG. 5 circuit, as discussed in connection with the pull-through mode, but in addition to modulating the aonode current flow on the upper anodes 280, as the bottom layer of cells is scanned, which is characteristic of the pull-through mode, the current flow through the lower anodes 230 is also modulated, as is characteristic of the push-through mode. Thus, there is both a pull-through and push-through effect in transferring the glow from the lower panel cells to the cells in the upper panel.

A fourth mode of operating the two-layer panel is with the bottom electrodes 230 as cathodes and the center and top electrodes as anodes. The central and top anodes should, however, be arranged in parallel alignment, both perpendicular to the bottom cathodes, and the glow transfer slots 240 preferably disposed between the bottom cathodes 230, rather than between the central anodes 270. Similar to the other operating modes, a glow discharge is established between the lower cathodes 230 and the central anodes 270, along a column of cells and the glow is then advanced in column-by-column scan across the lower layer of the panel, as signal information is applied synchronously to the upper anodes 280. As the scanning progresses, the glow from select ones of the bottom cells is tranferred into aligned cells of the upper panel. The mechanism of this transfer appears to be merely an extension of the positive column which has been produced in the bottom cells and, consequently, the glow secured by this mode of operation does not achieve the brightness levels of the modes previously described. Typical operating voltages are about −100 volts for the cathodes, about +60 volts for the center anodes, and about +120 volts for the upper anodes which are to bring the glow into the upper cells. In the operation of this mode, if the applied voltage is removed from the lower cathodes 230, and the voltage between the upper two electrodes increased, after the glow transfer to the upper layer has been effected, the glow will actually extinguish in the lower cell and tranfer in toto to the upper cell giving normal brightness.

It shold be understood that the various two-layer panels discussed are not limited to column-by-column scanning. Although column-by-column scanning is most convenient for many applications, these devices may all be operated in accordance with any of the scanning modes discussed in connection with the single-layer panels of FIG. 1 through 8. Thus, they may be scanned row by row or cell by cell or in other cell groupings, as will be apparent from the foregoing discussion. Further, the cell-by-cell scanning may be a sequential scan, or the random address location scheme discussed in connection with the single-layer panel. Also, the number of phases of the scanning drive may be modified as discussed, or selectively reversed, and the scanning rate in both the single and double-layer panels may be selectively varied. Thus, by a selective variation of the scanning rate, one can selectively control the brightness of the display or the relative brightness of the respective cells. Further, one can advantageously use a high scanning rate when searching for an address, as in random address location, and a lower rate during the display time.

As discussed in connection with the single-layer panel, the voltages applied to the lower electrodes 230 and the central electrodes 270 of the two-layer panel may be reversed in order to reverse the cathode-anode function of these electrodes, making an appropriate voltage change on the top electrodes 280 when necessary. This may be done either between operations of the panel or in the course of a single operation, and may be utilized either for the purpose of maintaining the preferred cathode switching, rather than anode switching, or for the purpose of altering the mode of operation of the panel.

Also, the glow communicating channels 240 of the lower layer of the panel may be incorporated into the upper layer instead, if preferred, or channels may be disposed in both the upper and lower layers. Further, information which has been transferred from the lower layer to the upper layer can subsequently be transferred back to the lower layer, by applying an appropriate pull-through potential to the bottom electrodes of the lower layer, or a push-through potential to the top electrode of the upper layer, or both. In addition, various combinations of transfer, up and back, combined with scanning in one or both of these layers, may be utilized depending upon the objects to be achieved, as will be apparent to one skilled in the art from the foregoing disussion.

While it has been mentioned in connection with all of the panels discussed that a gray scale display can be achieved by controlling the current flow through the display cells, it should be emphasized that the gray scale display of the two-layer panel is far better than that of the single-layer panel. A serious problem in securing a gray scale display in gaseous discharge deivces is that at low current levels the discharge tends to fall into relaxation oscillations, which result in undesired background scintillation and often a decay and termination of the glow. Because of the ready availability of charged particles in the bottom layer of the two-layer panel, the current flow through the display cells of the top layer can be decreased almost to zero without experiencing relaxation oscillation. This permits contrast levels of gray scale which appear to be in the order of 200 to 1, which is most unusual in gaseous devices, while the contrast levels thus far achieved in the single-layer panel are in the order of 10 to 1 or less.

Further, while it has been explained that the gray scale can be produced in the various panels by controlling the current level of the display cells, it can also be achieved by pulse width modulating the applied information signals so that the time at which the display cells operate is selectively controlled. Further, a gray scale display can also be achieved by a combination of these two methods, namely a combination of the current level control and pulse width modulation methods.

Another feature of the disclosed panels, both single-layer and two-layer, is the utilization of pulses immediately prior to the glow transfer. Such pulses may be applied either to the cathodes or anodes of the priming cells to increase the population of the charged particles in those cells immediately prior to the glow transfer, to aid the transfer process. Such pulses may also serve to increase the operating efficiency of the panel by permitting the priming cells to be operated quiescently at a relatively low level, and then pulsed immediately prior to the glow transfer. It should be understood, however, that the number of charaged particles cannot be increased instantaneously. Some time is required for this to take place, and consequently, the population increase pulses must be applied for suficient time, in the order of 2 to 5 microseconds, before initiating the transfer to permit the charged particle level to increase sufficiently before the glow transfer operation takes place.

Also, the disclosed panels can be used in a time sharing arrangement, where the information signals to be displayed are multiplex and supplied to two panels, or to one panel and another device, on a time sharing basis. The only limitation to this is that a sufficient duty cycle should be maintained to insure adequate brightness. Further, two sets of anodes in the same panel may be operated on such a time sharing basis. In addition, two panels may be operated in parallel to secure the same displays, or the reverse or the negative display, simultaneously on such panels.

Those skilled in the art will appreciate that modifications may be made in practicing the invention. For example, in very large wall-size panels in which cells are relatively widely spaced, gas communcation paths between cells may be formed by roughening the adjacent surfaces of the glass plates which make up the panel so that diffusion between cells can take place through the roughened areas. The same effect can be achieved in the manufacture of the plates by forming the plates in such a way as to avoid perfectly flat or smooth mating surfaces. The same effect can also be achieved by not setting the electrodes into the plates, but permitting them to space the plates apart by a small amount sufficient to permit particle diffusion.

In addition, it is clear that, in some applications, the gas communication slots need not be formed in an orderly arrangement as shown and described above wherein each slot extends directly horizontally from one cell to an adjacent cell. Other more random arrangements may be utilized. The concealed particle supply cells may also be modified, for example, by having them dispersed throughout a panel or in multiple columns, or in multiple rows, or in rows and columns suitably connected together and operated to provide excited particles for the display cells.

Lastly, while an attempt has been made to explain the theory of operation of the disclosed panels, the gas physics involved is most complex, and further investigation with these panels may show that part or all of the theory advanced is in error. However, the usefulnes of the panels is in no way predicated upon the accuracy of the theory which has been advanced.

What is claimed is:

1. A generally flat display panel comprising a gas-filled envelope containing a gas capable of sustaining cathode glow, an insulating plate including a plurality of anode electrodes and a plurality of cathode electrodes oriented spaced apart with the anodes crossing the cathodes, with first gas-filled glow cells defined by each crossing of a pair of electrodes, said first glow cells being arrayed in rows and columns, gas communication channels formed in said plate and interconnecting all of said glow cells in a series which defines a raster, said channels extending along each row of cells and including row-connecting channels formed between selected cells in adjacent rows of cells, an auxiliary cell for facilitating the start of a scanning operation and associated with the first cell in the scanning series, said auxiliary cell generating excited particles and being positioned with respect to said first cell to permit said escited particles to diffuse thereto, and said anode and cathode electrodes including circuit means for receiving electrical potential for firing each cell in said raster series in turn beginning with the first cell in the first row of cells and scanning through each row of cells to the last cell in the last row of cells to perform a scanning operation, said gas communication channels serving to permit diffusion of excited particles from an ionized and glowing cell to an adjacent cell in the scanning series as a scanning operation is performed through said series of cells so that the ionization and turn-on of said adjacent cell is facilitated by the presence of said excited particles.

2. A display panel comprising a gas-filled envelope including at least an insulating base plate and a cover plate and, associated therewith, a plurality of anode electrodes and a plurality of cathode electrodes oriented so that the anodes lie at an angle with respect to the cathodes and each anode crosses each cathode, with gas-filled glow cells defined by each such crossing and the volume of gas between the crossed electrodes, there being a plurality of rows and columns of said cells in said base plate formed by said electrodes, there being a first row, a last row and intermediate rows, and gas communication channels formed in said base plate and interconnecting each row of cells to the row of cells adjacent to it with only the last cell in the first row coupled to the last cell in the adjacent second row and only the first cell in the adjacent second row coupled to the first cell in the third row, such end-to-end coupling of said rows of cells being made throughout said panel whereby all of the cells of the panel are coupled together in a continuous series beginning with the first cell in the first row and ending with the last cell in the last row whereby, when suitable electrical potentials are applied to said anode and cathode electrodes, glow can be transferred from one cell to the next in each row successively throughout said panel.

3. A display panel including a gas-filled envelope consisting of a first insulating base plate and a second insulating cover plate, means forming a plurality of gas-filled cells in said base plate, said cells being arrayed in rows and columns, an anode electrode and a glow cathode electrode associated with each cell and a gas communication path in said base plate connecting all of said cells in a series beginning with a first cell and ending with a last cell, said series forming a raster pattern, said rows of cells including a first row, intermediate rows and a last row, and said gas communication path extending from the first cell in the first row along said first row to the last cell therein and from said last cell in said first row to the adjacent last cell in the second row of cells and from there to the first cell in the second row and thence to the adjacent first cell in the third row of cells, etc. until it reaches the last cell in the last row of cells, and an auxiliary cell for facilitating the start of a scanning operation and associated by a gas communicatiom channel with the first cell in the first row of said scanning series.

4. A display panel comprising a gas-filled envelope including at least an insulating base plate and a cover plate and, associated therewith, a plurality of anode electrodes and a plurality of cathode electrodes oriented so that the anodes lie at an angle with respect to the cathodes and each anode crosses each cathode, with gas-filled glow cells defined by each such crossing and the volume of gas between the crossed electrodes, there being a plurality of rows and columns of said cells in said base plate formed by said electrodes, there being a first row, a last row and intermediate rows, and there being a first column, a last column and intermediate columns, each anode being aligned with a row of cells and each cathode electrode being aligned with a column of cells, and gas communication channels formed in said base plate and interconnecting each row of cells to the row of cells adjacent to it with the last cell in the firt row coupled to the last cell in the adjcent second row and the first cell in the adjacent second row coupled to the first cell in the third row, such end-to-end coupling of said rows of cells being made throughout said panel whereby all of the cells of the panel are coupled together in a continuous series beginning with the first cell in the first row and ending with the last cell in the last row whereby, when suitable electrical potentials are applied to said anode and cathode electrodes, glow can be transferred from one cell to the next in each row successively throughout said panel.

5. The panel defined in claim 4 and including first circuit means connected to said row anode electrodes for applying operating potential to each anode in turn, and second circuit means connected to said column cathode electrodes for applying operating potential to each cathode electrode in turn, said first and second circuit means being operated to first apply operating potential to said first row anode and to each of said column cathodes beginning with the first and proceeding in a first direction to the last, and then applying operating potential to the second row anode and to each of the column cathodes in turn beginning with the last and proceeding in the opposite direction to the first, and then applying operating potential to the third row anode and to each of the column cathodes in turn beginning with the first and proceeding in the first direction to the last, etc., until operating potential has been applied to the last row anode and to each of the column cathodes in turn whereby each cell in each row is turned on in a continuous series beginning with the first cell in the first row and ending with the last cell in the last row.

6. A display panel comprising a gas-filled envelope including at least an insulating base plate and a cover plate and, associated therewith, a plurality of anode electrodes and a plurality of cathode electrodes oriented so that the anodes lie at an angle with respect to the cathodes and each anode crosses each cathode, with gas-filled glow cells defined by each such crossing and the volume of gas between the crossed electrodes, there being a plurality of rows and columns of said cells in said base plate formed by said electrodes, therebeing a first row, a last row and intermediate rows, and there being a first column, a last column and intermediate columns, each anode electrode being aligned with a row of cells and each cathode electrode being aligned with a column of cells, vertical gas communication channels formed in said base plate and interconnecting each cell in each row of cells with the corresponding cell in the row of cells adjacent to it and horizontal gas communication channels formed in said base plate and interconnnecting each cell in each column of cells with the corresponding cell in the column of cells adjacent to it, first circuit means connected to said anode electrodes for applying operating potential to each anode in turn, and second circuit means connected to said cathode electrodes for applying operating potential to each cathode electrode in turn, said first and second circuit means being operated to transfer glow from cell to cell in vertical and horizontal directions from row to row and from column to column.

7. A generally flat display panel comprising a gas-filled envelope containing a gas capable of sustaining cathode glow, an insulating plate including a plurality of anode electrodes and a plurality of cathode electrodes oriented spaced apart with the anodes crossing the cathodes, with first gas-filled glow cells defined by each crossing of a pair of electrodes, said first glow cells being arrayed in rows and columns, gas communication channels formed in said plate and interconnecting all of said glow cells in a series which defines a raster, said channels extending along each row of cells and including row-connecting channels formed between selected cells in adja cent rows of cells, and circuit means coupled to said anode and cathode electrodes for receiving electrical potentials for ionizing and turning-on each cell in said raster series in turn beginning with the first cell in the first row of cells and scanning through each row of cells to the last cell in the last row of cells to perform a scanning operation, said gas commnication channels serving to permit diffusion of excited particles froman ionized and glowing cell to an adjacent cell in the scanning series as a scanning operationg is performed through said series of cells so that the ionization and turn-on of said adjacent cell is facilitated by the presence of said excited particles.

8. A display panel comprising a gas-filled envelope including at least an insulating base plate and a cover plate and, associated therewith, a plurality of anode electrodes and a plurality of cathode electrodes oriented so that the anodes lie at an angle with respect to the cathodes and each anode crosses each cathode, with gas-filled glow cells defined by each such crossing and the volume of gas between the crossed electrodes, there being a plurality of rows and columns of said cells formed by said electrodes, tehre being a first row, a last row and intermediate rows, and gas communication channels formed in said plate and interconnecting each row of cells to the row of cells adjacent to it with the last cell in the first row coupled to the last cell in the adjcent second row and the first cell in the adjcent second row coupled to the first cell in the third row, such end-to-end coupling of said rows of cells being made throughout said panel whereby all of the cells of the panel are coupled together in a continuous series beginning with the first cell in the first row and ending with the last row whereby, when suitable electrical potentials are applied to said anode and cathode electrodes, glow can be transferred from one cell to the next in each row successively throughout said panel.

* * * * *